United States Patent Office 2,751,040
Patented June 19, 1956

2,751,040

FILTERS COATED WITH POLYAMIDE-THICKENED OILS

Fred J. Hanly, Berkeley, Calif., assignor to California Research Corporation, San Francisco, Calif., a corporation of Delaware No Drawing. Application December 23, 1952,
Serial No. 327,698

6 Claims. (Cl. 183—44)

This invention pertains to filter materials coated with certain thickened hydrocarbon oils.

Impingement-type air filters are useful in numerous instances to remove undesirable particles from the air. It is a primary function of air filters to entrap dust particles and other foreign solid bodies present in the air, to remove such particles before the air is used. Such air filters are useful in various industrial installations (e. g., pharmaceutical preparational laboratories), in railroad diesel engines, in office buildings, in homes, in automotive equipment, etc. In railroad diesel engines, for example, it is essential that the breathers on the diesel engines suck in air which is substantially free of all foreign matter in order to prevent damage to the various moving parts within the engine, such as scoring of cylinders, etc.

Filter elements normally have the surface of the structural permeable mass wetted with oil films to improve the dust-catching ability of the filter units. The dust particles impinge upon the oil surface; the oil film wets the dust particles and holds these particles, preventing their passage through the filter unit. The oils which heretofore have been used to produce the surface film have been fluids which have a tendency to flow from the material serving as the structural unit of the filter, leaving just the bare filter material, which of itself is quite inefficient in continually removing dust particles from air streams. The dry fibers or bare wire screens do not retain dust particles. Such oils are lost too soon, and must be continually replaced. Furthermore, when oils flow freely, the filter units require a means of "picking up" the oil flowing from the filter units, unnecessarily hampering filtering operations.

In attempting to avoid the disadvantages of a filter element having a surface oil film which flows too freely and leaves dry fibers or wire screens, certain thickening agents, such as polybutenes have been incorporated into the oil film of the filter element. Although such oil films are thickened and have the appearance of "tackiness;" this apparent tackiness is evident only at high flow rates, and it contributes little, if any, improvement in retention or dust-collecting power to the filter element. When the polybutene concentration in the oil film is sufficient to increase the viscosity appreciably, the retention of the oil film may be improved. However, this improvement is for only a relatively short period of time, and even then, leakage is still excessive because the oil film continues to flow off the filter element until only a thin, ineffective film held by surface forces only, is present.

It has now been discovered that greatly superior dust-catching and dust-retention efficiency is obtained with a filter element of permeable structural mass coated with a material having high "adhesiveness" and high "wicking."

As used herein, the term "adhesiveness" means the resistance of the coating to flow under mild forces imposed by gravity. Thus, the coatings on the filter material of the present invention are to be contrasted to films of oils heretofore employed. Oils which have been used, including polybutene-thickened oils, exhibit true Newtonian fluid properties, that is, freely flowing under the force of gravity or other mild external force.

The terms "wicking" means that the property of the coating of the filter material to continually wet the dust particles collecting on the coating surface. Thus, when dust impinges on a filter surface, there is a tendency to build up superimposed layers of dust. The faster an oil of a filter coating wets the dust particles and passes through that dust layer to present a new filter-oil surface for catching new dust particles, the greater is the wicking tendency.

With prior filter elements, when the viscosity of the oil film was sufficiently high to give the adhesiveness necessary to maintain itself on the filter material for an appreciable time, the viscosity of such an oil film was too high for adequate wicking.

According to the present invention, the above-described features of high adhesiveness and high wicking, which features were heretofore believed to be antagonistic and not attainable in a single filter material, are obtained simultaneously in an improved impingement-type filter element embodying on a permeable structural mass a coating of a base oil having certain polymeric compounds incorporated therein.

These improved filter materials have a greater capacity for dust, that is, they are more effective in removing dust particles from air passing through the filter element than heretofore believed possible. This means that a greater amount of dust will be collected by the new filter elements. Consequently, the period between replacement or reactivation will be longer as compared to filter elements heretofore proposed. In some cases, the amount of dust withdrawn from the air and retained on the new filter element is 200% or more by weight than that possible for the older filter elements. Furthermore, the improved filter elements maintain a sustained efficiency of dust-entrapment throughout the period of use.

The thickening agents used herein to thicken the base oils sufficiently to the consistency of filter oils are certain polymeric compounds. The following formula represents a monomer, one unit, of which the polymeric compounds are composed:

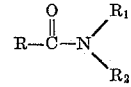

wherein R is a hydrocarbon radical having a polymerizable ethylenic linkage containing from 2 to 3 carbon atoms, $R_1$ is hydrogen or an alkyl, aryl or alkaryl radical, $R_2$ is an alkyl, aryl or alkaryl radical; $R_1$ and $R_2$ contain a total of from 4 to 12 straight-chain or branched-chain, aliphatic carbon atoms.

It is preferred that the mono-amide is a derivative of acrylic or methacrylic acids, and that $R_1$ and $R_2$ of the above formula contains a total of from 6 to 10 aliphatic carbon atoms.

Examples of R include radicals of ethylene (i. e., $CH_2=CH$) and propene (i. e., $CH_3-CH=CH-$; $CH_2=CH-CH_2-$ and $CH_2=C(CH_3)-$).

Examples of $R_1$ and $R_2$, when $R_1$ is not hydrogen, include the following radicals: butyl, pentyl, hexyl, n-octyl, 2-ethylhexyl, decyl, dodecyl, phenyl, butylphenyl, 2-ethylhexyl phenyl, dodecylphenyl, etc.

The monomer of the formula hereinabove can be prepared by the reaction of an unsaturated carboxylic acid (e. g., acrylic acid, methacrylic acid, crotonic acid, isocrotonic acid, vinylacetic acid, etc.) with primary or secondary amines.

Examples of such amines include butyl amine, dibutyl amine, pentyl amine, hexyl amine, dihexyl amine, butyl hexyl amine, butyl 2-ethylhexyl amine, 2-ethylhexyl amine, n-octyl amine, decylamine, dodecyl amine, N-butyl aniline, N-hexyl aniline, N-2-ethylhexyl aniline, N-dodecyl aniline, p-tert-butyl aniline, o-tert-butyl aniline, p-octyl aniline, 2,4,6-tributyl aniline,, etc.

Examples of monomers from which are derived the polymers used herein to thicken filter oils include N,N-hexyl, butyl acrylamide, N,N-dibutyl acrylamide, N-hexyl acrylamide, N-octyl acrylamide, N,N-octyl butyl acrylamide, N-decyl acrylamide, N,N-dodecyl acrylamide, N-butyl methacrylamide, N,N-dibutyl methacrylamide, N-hexyl methacrylamide, N,N-dihexyl methacrylamide, N,N-hexyl, butyl methacrylamide, N,N-butyl, 2-ethylhexyl methacrylamide, N-decyl methacrylamide, N-dodecyl methacrylamide, N,N-dibutyl vinylacetamide, N,N-butyl, 2-ethylhexyl vinylacetamide, N,N-dihexyl vinylacetamide, N-decyl vinylacetamide, N-dodecyl vinylacetamide, N,N-butyl, octyl vinylacetamide, N,N-butyl, n-octyl crotonamide, N,N-butyl, 2-ethylhexyl crotonamide, N-dihexyl crotonamide, N,N-n-octyl, n-butyl crotonamide, N-2-ethylhexyl crotonamide, N,N-butyl, hexyl crotonamide, etc.

The monomers set forth hereinabove form high molecular weight polymeric compounds. For the purposes of this invention, the polymeric compounds have molecular weights ranging from 4000 to 40,000. It is preferred to use polymers having molecular weights of about 8000 to about 20,000.

The polymeric compounds set forth herein are used in amounts sufficient to thicken the base oils to the consistency desired for the filter oils. That is, the amounts of polymeric compounds used are sufficient to obtain adequate thickening of the oil to obtain desired adhesiveness, yet amounts which are less than that which interferes with the wicking tendency. Such amounts of polymeric compounds in filter oils are from about 0.5% by weight to about 10% by weight. It is preferred to use the polymeric compounds in amounts of from about 3% to about 5%.

Unlike the oil-soluble polymers, such as polyvinyl stearates, the polymers of this invention are substantially insoluble in the base oil at temperatures below about 190° F. However, they may be dissolved in oil with the aid of heat and, once dissolved, they remain suspended even after the oil is cooled below the dissolution temperature. However, the cooled suspension is no longer a true fluid, because it contains a network which gives it a semirigid structure and prevents it from flowing under low shear stresses, and thus greatly improves its retention on a filter element as compared with a true fluid. At the same time, if the polymer-oil suspension is made up from an oil of moderate viscosity, the oil readily extrudes through a layer of dust collected on the surface to catch additional layers of dust.

Base oils which are combined with the polymeric compounds to form the coating in the filter elements include a wide variety of hydrocarbon lubricating oils (i. e., hydrocarbon oils of lubricating viscosity) such as naphthenic base, paraffin base and mixed base mineral oils, other hydrocarbon lubricants, e. g., lubricating oils derived from coal and synthetic oils, e. g., alkylene polymers (such as polymers of propylene, butylene, etc., and mixtures of polymeric olefins), alkyl benzene polymers, etc.

As used herein, the terms "filter material" and "permeable structural mass" refer to materials to which the polymer-containing oil coatings adhere and which, when so coated, permit the passage of air without appreciable channeling. It is essential that the air follows a tortuous path to multiply the contacts which the air has with the oily coated surfaces. It is readily understood that the presence of an oily coating upon filter materials impedes the flow of air somewhat. However, the amount of such impedance is not necessarily constant and may be varied according to the use to which the filter is put. For example, on a railroad diesel engine, because of the large amount of air used, it becomes essential that the pressure drop across the filter be as low as possible. On the other hand, when a filter unit is used to filter air going into a residence, the pressure drop across the filter unit is of no great consequence because of the relatively small amount of air which may pass through the filter.

Thus, the filter materials and the shapes of such materials, as well as the amount of coating applied, are selected so that the pressure drop across the filter element is not excessive for any particular service. Furthermore, depending upon the type and shape of materials and the structural mass derived therefrom, the amount of polymer-containing base oil applied is less than that which causes an appreciable "webbing over" or plugging of holes or air spaces, but is at least sufficient to form a coating over a majority of the surface area of the structural mass.

Examples of filter materials having the above characteristics include wire meshes, fibers, particles of various kinds, etc., prepared from glass, limestone, bituminous substances, plastic materials, plastic fibers, plant substances, animal substances, ceramic substances, wood, rubber, etc. These wire meshes and fibers can be convoluted and the particles arranged into a permeable structural mass in such a way as to force the air to follow a tortuous path through the filter element. The filter materials can be so arranged (supported) in a framework (a cartridge) in a manner to form a unit which may be readily removed as such for convenient renewal or regeneration of the coated filter material.

The superiority of the improved filter elements of the present invention is illustrated by the following examples.

*Example 1*

When 3% by weight of a poly (N-dihexyl methacrylamide) having an average molecular weight of about 4000 is incorporated in a California solvent-refined naphthenic base lubricating oil having a viscosity of 450 SSU at 100° F., and a weighed wire screen is dipped in this filter oil at 190° F., and the dipped screen is allowed to hang free for 24 hours at room temperature to permit drainage of the excess oil, the amount of the thickened oil retained on the screen is about 100% more by weight than the unthickened base oil.

When 5% of a poly (N-dioctyl acrylamide) having an average molecular weight of about 5000 is incorporated in a California solvent-refined naphthenic base lubricating oil having a viscosity of 450 SSU at 100° F., and a weighed wire screen is dipped into this filter oil at 190° F., and the dipped screen is allowed to hang free for 24 hours at room temperature to permit drainage of the excess oil, the amount of the thickened oil retained on the screen is about 200% more by weight than the unthickened base oil.

*Example 2*

When 3% of a poly (N-dodecyl acrylamide) having an average molecular weight of about 8000 is incorporated in a California solvent-refined naphthenic base lubricating oil having a viscosity of 450 SSU at 100° F., and a weighed wire screen is dipped into this filter oil at 190° F., and the dipped screen is allowed to hang for 24 hours at room temperature to permit drainage of the excess oil, the amount of the thickened oil retained on the screen is about 100% more by weight than the unthickened base oil.

A characteristic of the filter oils described herein for coating filter materials is the resistance of such oils to emulsification in water. Water resistance is generally recognized as a service requirement of filter material coated with filter oils. It is essential that the adhesive is not removed by accidental contact with water. When the filter materials are made from a metal, such resistance to emulsification in water also inhibits rusting of the filter material.

In addition to the thickening agents set forth herein, the filter materials may be coated with oils containing oxidation inhibitors (e. g., selenides, sulfides, etc.), oiliness agents (e. g., fatty acids), other thickening agents (e. g., amides, soaps, polyethylene, etc.), color correctors, dispersants (e. g., metal sulfonates, polymeric glycols, etc.), corrosion inhibitors, etc.

I claim:

1. An impingement type air filter of improved adhesiveness and wicking characteristics comprising a permeable structural mass wetted with a composition consisting essentially of a hydrocarbon oil of lubricating viscosity and from about .5 to about 10% by weight of a polymeric amide having a molecular weight of about 4,000 to about 20,000, said polymeric amide being derived from a monomer of the formula

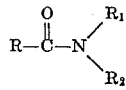

wherein R is a hydrocarbon radical containing an ethylene linkage and having from 2 to 3 carbon atoms, $R_1$ is selected from the group consisting of hydrogen and alkyl radicals, $R_2$ is an alkyl radical, and $R_1$ and $R_2$ together contain a total of from 4 to 12 carbon atoms; said composition being a Newtonian fluid at temperatures above about 190° F. and a non-Newtonian semi-rigid mass at room temperature, said polymeric amide at room temperature being insoluble in the oil and being uniformly suspended therein.

2. A filter in accordance with claim 1 in which the polymeric amide is a poly N-dialkyl acrylamide.

3. A filter in accordance with claim 1 in which the polymeric amide is a poly N-dialkyl acrylamide.

4. A filter in accordance with claim 1 in which the polymeric amide is a poly N-alkyl methacrylamide.

5. A filter in accordance with claim 1 in which the polymeric amide is a poly N-dialkyl methacrylamide.

6. A filter in accordance with claim 1 in which the polymeric amide is N-dodecylacrylamide.

References Cited in the file of this patent

UNITED STATES PATENTS

| | | |
|---|---|---|
| 2,145,898 | Simpson | Feb. 7, 1939 |
| 2,353,937 | Smith | July 18, 1944 |
| 2,387,501 | Dietrich | Oct. 23, 1945 |
| 2,568,144 | Cremer et al. | Sept. 18, 1951 |
| 2,584,968 | Catlin | Feb. 12, 1952 |
| 2,613,184 | Catlin | Oct. 7, 1952 |
| 2,627,938 | Frohmader et al. | Feb. 10, 1953 |
| 2,653,133 | Catlin | Sept. 22, 1953 |
| 2,666,044 | Catlin | Jan. 12, 1954 |